US012749956B2

(12) United States Patent
Zhu

(10) Patent No.: US 12,749,956 B2
(45) Date of Patent: Sep. 29, 2026

(54) GALVANOMETER MOTOR AND LIDAR

(71) Applicant: SUTENG INNOVATION TECHNOLOGY CO., LTD., Shenzhen (CN)

(72) Inventor: Congcong Zhu, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 245 days.

(21) Appl. No.: 18/767,963

(22) Filed: Jul. 9, 2024

(65) Prior Publication Data

US 2025/0070631 A1 Feb. 27, 2025

(30) Foreign Application Priority Data

Aug. 25, 2023 (CN) ......................... 202311087476.9

(51) Int. Cl.
*H02K 29/08* (2006.01)
*G01S 7/481* (2006.01)
*H02K 21/24* (2006.01)

(52) U.S. Cl.
CPC ............ *H02K 29/08* (2013.01); *G01S 7/4817* (2013.01); *H02K 21/24* (2013.01); *H02K 2213/03* (2013.01)

(58) Field of Classification Search
CPC .... H02K 29/08; H02K 21/24; H02K 2213/03; H02K 11/22; H02K 21/22; H02K 5/04; H02K 11/21; G01S 7/4817; G01S 17/931
USPC ........................................................ 310/68 B
See application file for complete search history.

(56) References Cited

U.S. PATENT DOCUMENTS 6,072,296 A * 6/2000 Grieb .................. H02K 7/1025 318/727
2005/0168187 A1* 8/2005 Uchiyama ............. H02K 11/22 318/772
2015/0372543 A1* 12/2015 Lobo ........................ H02K 1/14 310/46
2017/0294824 A1* 10/2017 Brod ...................... H02K 29/10
2024/0241226 A1* 7/2024 Zhu ....................... G01S 7/4817
2025/0007343 A1* 1/2025 Zhu ........................ H02K 11/22

* cited by examiner

*Primary Examiner* — Ahmed Elnakib
(74) *Attorney, Agent, or Firm* — BAYES PLLC

(57) ABSTRACT

The present application provides a galvanometer motor and a LiDAR. The galvanometer motor includes a rotor assembly, a fixing structure, and an angular position sensor. The rotor assembly includes a shell, a rotating shaft, and a magnetic pole. The fixing structure includes a stator assembly, a mounting sleeve, and a base. The mounting sleeve is partially located inside the shell and partially extends to the outside of the shell through an opening. The mounting sleeve is movably socketed with the rotating shaft. The stator assembly is mounted on the outside of the mounting sleeve inside the shell. The stator assembly is used to generate a rotating magnetic field for driving the magnetic pole to rotate.

10 Claims, 16 Drawing Sheets

| Motor | Poles | Slots | Winding factor | Minimum Space Order |
|---|---|---|---|---|
| 1 | 14 | 12 | 0.96 | 2 |
| 2 | 10 | 15 | 0.86 | 5 |
| 3 | 16 | 12 | 0.86 | 4 |
| 4 | 20 | 15 | 0.86 | 5 |

FIG. 8

| Pole-slot Combination | Minimum space order | Fr/r^4 |
|---|---|---|
| 10P15S | 5 | 16.12 |
| 20P15S | 5 | 10.97 |
| 14P12S | 2 | 375 |

FIG. 9

GALVANOMETER MOTOR AND LIDAR

CROSS-REFERENCE TO RELATED APPLICATION

The present application claims the benefit of priority to Chinese Patent Application No. 202311087476.9, filed on Aug. 25, 2023, which is hereby incorporated by reference in its entirety.

TECHNICAL FIELD

The present application pertains to the field of motor technology, particularly to a galvanometer motor and a LiDAR.

TECHNICAL BACKGROUND

A motor is an electromagnetic device that realizes the conversion or transmission of electrical energy based on the law of electromagnetic induction. In a LiDAR, a galvanometer motor is used to drive the galvanometer to rotate, thereby changing the scanning position of the laser beam. As the galvanometer rotates, the laser beam performs reciprocating scanning in the horizontal direction.

However, the outer diameter of the existing galvanometer motors is relatively large, resulting in a large volume of the LiDAR, which is not conducive to the installation of the LiDAR on automobiles, robots, logistics vehicles, or inspection vehicles.

SUMMARY

Embodiments of the present application are to provide a galvanometer motor and a LiDAR.

In an aspect, the present application provides a galvanometer motor, which includes: a rotor assembly, comprising a shell, a rotating shaft, and a magnetic pole, the shell having a first end and a second end arranged opposite to each other, the second end of the shell being open, one end of the rotating shaft being connected to the first end of the shell, the other end of the rotating shaft extending towards the opening, the magnetic pole being mounted on the inner side wall of the shell, and there being a gap between the magnetic pole and the rotating shaft;

- a fixing structure, comprising a stator assembly, a mounting sleeve, and a base, the mounting sleeve being partially located inside the shell and partially extending to the outside of the shell through the opening, the mounting sleeve being movably socketed with the rotating shaft, the stator assembly being mounted on the outside of the mounting sleeve inside the shell, there being a gap between the stator assembly and the magnetic pole, the stator assembly being used to generate a rotating magnetic field for driving the magnetic pole to rotate, the base being mounted on the mounting sleeve outside the shell, and there being a gap between the base and the second end of the shell; and
- an angular position sensor, used to detect the angular position of the rotor assembly, comprising a trigger and a sensing element, the trigger being mounted on the second end of the shell, and the sensing element being mounted on a side surface of the base close to the shell.

In an embodiment, the inner side wall of the second end of the shell is provided with a first step, one end of the trigger is mounted on the first step, and the other end of the trigger extends outside the shell towards the base.

In an embodiment, a part of the trigger abutting the first step extends towards the rotating shaft to form a first supporting plane, the inner side wall of the first end of the shell is provided with a second step, one end of the magnetic pole abuts the second step, and the other end of the magnetic pole abuts the first supporting plane.

In an embodiment, the maximum distance between the sensing element and the axis of the rotating shaft is 90% to 110% of the outer diameter of the shell.

In an embodiment, the base and the shell are coaxially arranged, and the outer diameter of the base is 90% to 110% of the outer diameter of the shell.

In an embodiment, the outer end surface of the first end of the shell is provided with a positioning block, the positioning block is used for cooperating with the positioning of the galvanometer of the LiDAR, there is a gap between the positioning block and the rotating shaft, and the positioning block has a positioning arc surface extending along the axis of the rotating shaft.

In an embodiment, a quantity of positioning blocks is three, and the positioning arc surfaces of the three positioning blocks are located on the same cylindrical surface.

In an embodiment, a quantity of poles of the magnetic pole is 20, and a quantity of slots of the stator assembly is 15.

In an embodiment, a quantity of poles of the magnetic pole is 10, and a quantity of slots of the stator assembly is 15.

In an embodiment, the stator assembly comprises a stator lamination and a stator winding, the stator lamination comprises a stator yoke and multiple stator teeth, the stator yoke is annular and coaxially arranged with the rotating shaft, the multiple stator teeth are connected to the outer side of the stator yoke, the multiple stator teeth are uniformly distributed at equal intervals along the circumferential direction of the stator yoke, and the stator winding is wound on the multiple stator teeth.

In an embodiment, the stator teeth comprise a tooth root and a tooth top sequentially connected along the radial direction of the stator yoke, the tooth root is connected to the end of the stator yoke.

In an embodiment, the size of the tooth root along the circumferential direction of the stator yoke is 1.0 mm to 1.2 mm.

In an embodiment, the interval size between adjacent tooth tops along the circumferential direction of the stator yoke is 1.3 mm to 1.5 mm.

In an embodiment, the inner diameter of the stator yoke is 8 mm to 11 mm.

In an embodiment, the outer diameter of the stator yoke is 11.5 mm to 12.5 mm.

In an embodiment, the outer diameter of the tooth top is 20 mm to 20.5 mm.

In an embodiment, the inner diameter of the magnetic pole is 20.7 mm to 21 mm.

In an embodiment, the outer diameter of the magnetic pole is 23 mm to 24 mm.

Embodiments of the present application provide a LiDAR, comprising a galvanometer and any one of the aforementioned galvanometer motors, the galvanometer being mounted on the shell.

In an embodiment, the LiDAR comprises a dynamic balancing element, a first end cover, and a second end cover, the galvanometer is sleeved on the shell and the base, the first end cover is mounted on one end of the galvanometer, and the second end cover is mounted on the other end of the galvanometer; wherein the dynamic balancing element is fixedly bonded to the first end cover and/or the second end cover using adhesive with preset mass, or the dynamic balancing element is welded to the first end cover and/or the second end cover using solder with preset mass.

The stator assembly generates a rotating magnetic field, the magnetic pole rotates in the rotating magnetic field and drives the shell to rotate, the trigger of the angular position sensor rotates synchronously with the shell, and the sensing element cooperates with the trigger to obtain the angular position of the rotor assembly; part of the mounting sleeve, the base, and the angular position sensor are located outside the shell, so the shell does not need to be enlarged to encase the angular position sensor and other components, which helps reduce the outer diameter of the shell, and consequently, the outer diameter of the galvanometer can also be reduced, aiding in the miniaturization of the LiDAR, reducing the outer diameter and volume of the galvanometer motor and LiDAR, install the LiDAR in devices with limited space.

BRIEF DESCRIPTION OF DRAWINGS

To more clearly explain the technical solutions in the embodiments of the present application, a brief introduction of the drawings used in the description of the embodiments is provided below.

FIG. 8 is a comparison table of the minimum space harmonic order of different pole-slot combinations of the galvanometer motor;

FIG. 9 is a comparison table of the vibration displacement caused by the main harmonic force wave of the galvanometer motor with different pole-slot combinations;

In the figures, the reference numerals indicate:

Figure 1:
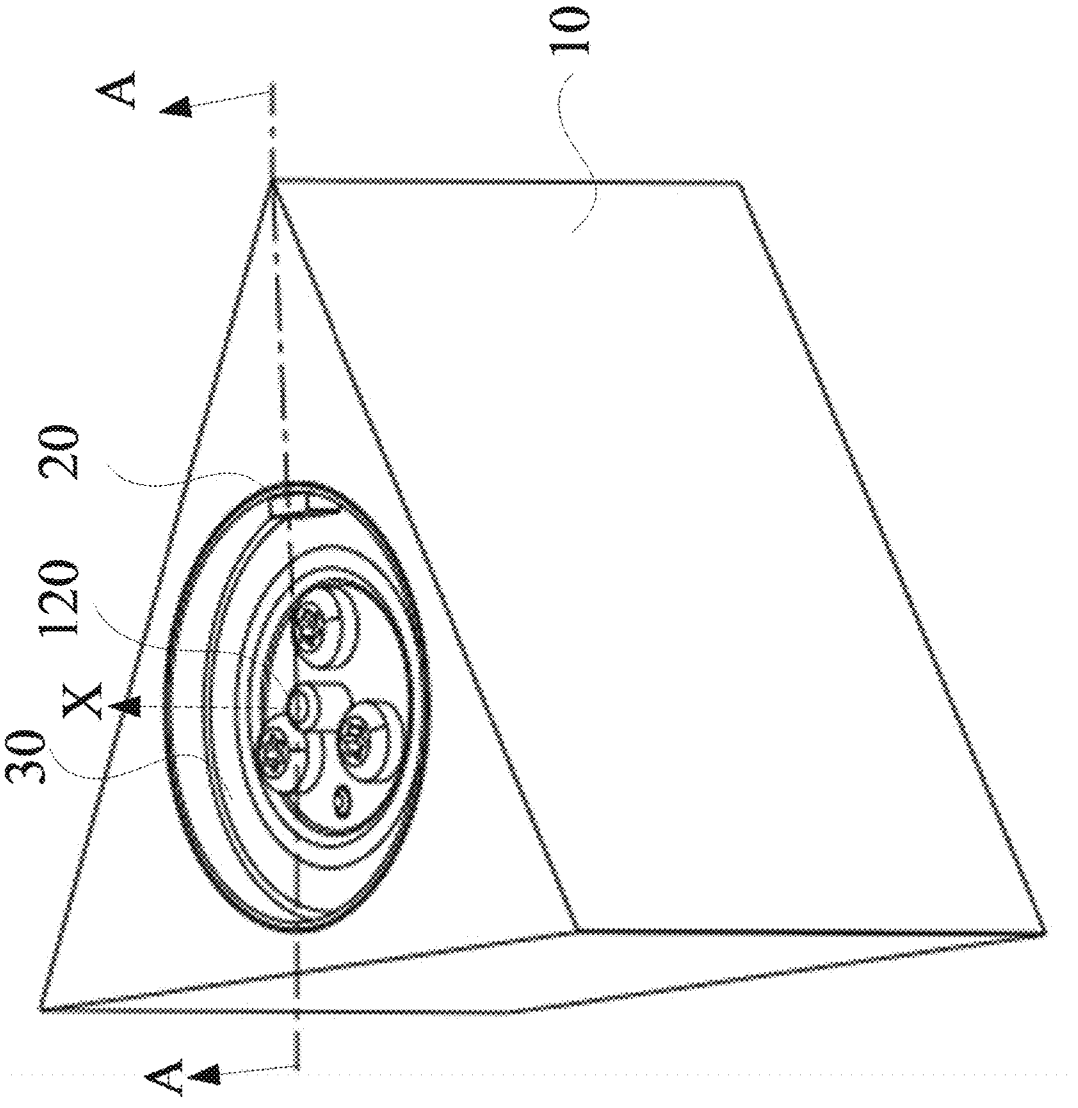
FIG. 1 is a structural schematic diagram of the LiDAR provided in an embodiment.

10, galvanometer; 20, dynamic balancing element; 30, first end cover; 40, second end cover; 50, first sleeve; 60, second sleeve;

100, rotor assembly; 110, shell; 111, opening; 112, first step; 113, second step; 114, positioning block; 1141, positioning arc surface; 115, notch; 116, guide pin; 117, reinforcing block; 118, connecting block; 120, rotating shaft; 130, magnetic pole;

200, fixing structure; 210, stator assembly; 211, stator lamination; 212, stator yoke; 213, stator tooth; 2131, tooth root; 2132, tooth top; 220, mounting sleeve; 230, base; 240, control board; 250, bearing; 260, Hall element; 270, support block; 271, mounting slot;

300, angular position sensor; 310, trigger; 311, first supporting plane; 312, limiting block; 313, reflecting part; 314, magnetic element; 320, sensing element; 321, first barrier; 322, second barrier; 323, detection slot; 324, light-emitting part; 325, magnetic encoder.

DETAILED DESCRIPTION

The embodiments of the present application are described in detail below. The embodiments are illustrated in the accompanying drawings, wherein the same or similar reference numerals represent the same or similar elements or elements having the same or similar functions.

Throughout the description, references to "an embodiment" or "the embodiment" mean that a particular feature, structure, or characteristic described in connection with the embodiment is included in at least one embodiment of the present application. Therefore, the appearances of the phrases "in an embodiment" or "in some embodiments" in various places throughout this specification are not necessarily all referring to the same embodiment. Furthermore, particular features, structures, or characteristics described may be combined in any suitable manner in one or more embodiments.

The terms "length," "width," "upper," "lower," "front," "rear," "left," "right," "vertical," "horizontal," "top," "bottom," "inner," "outer," and the like indicate orientations or positional relationships based on the orientations or positional relationships shown in the drawings, which are merely for convenience in describing the present disclosure and simplifying the description, rather than indicating or implying that the referred devices or elements must have a specific orientation, be constructed, and operate in a specific orientation.

The terms "first," "second" are used for descriptive purposes only and should not be understood as indicating or implying relative importance or implicitly indicating a quantity of technical features. Thus, a feature defined as "first" or "second" may expressly or implicitly include one or more of that feature.

Unless otherwise specified, "mount," "connect," and "fix" should be understood in a broad sense, such as fixed connection, removable connection, or integral connection; mechanical connection or electrical connection; direct connection or indirect connection through an intermediary; and the internal communication between two components or the interaction relationship between two components.

FIG. 1 is a structural schematic diagram of the LiDAR provided in an embodiment.

Referring to FIG. 1, an embodiment provides a LiDAR, which includes a galvanometer 10 and a galvanometer motor, wherein the galvanometer 10 is mounted on the galvanometer motor.

Figure 2:
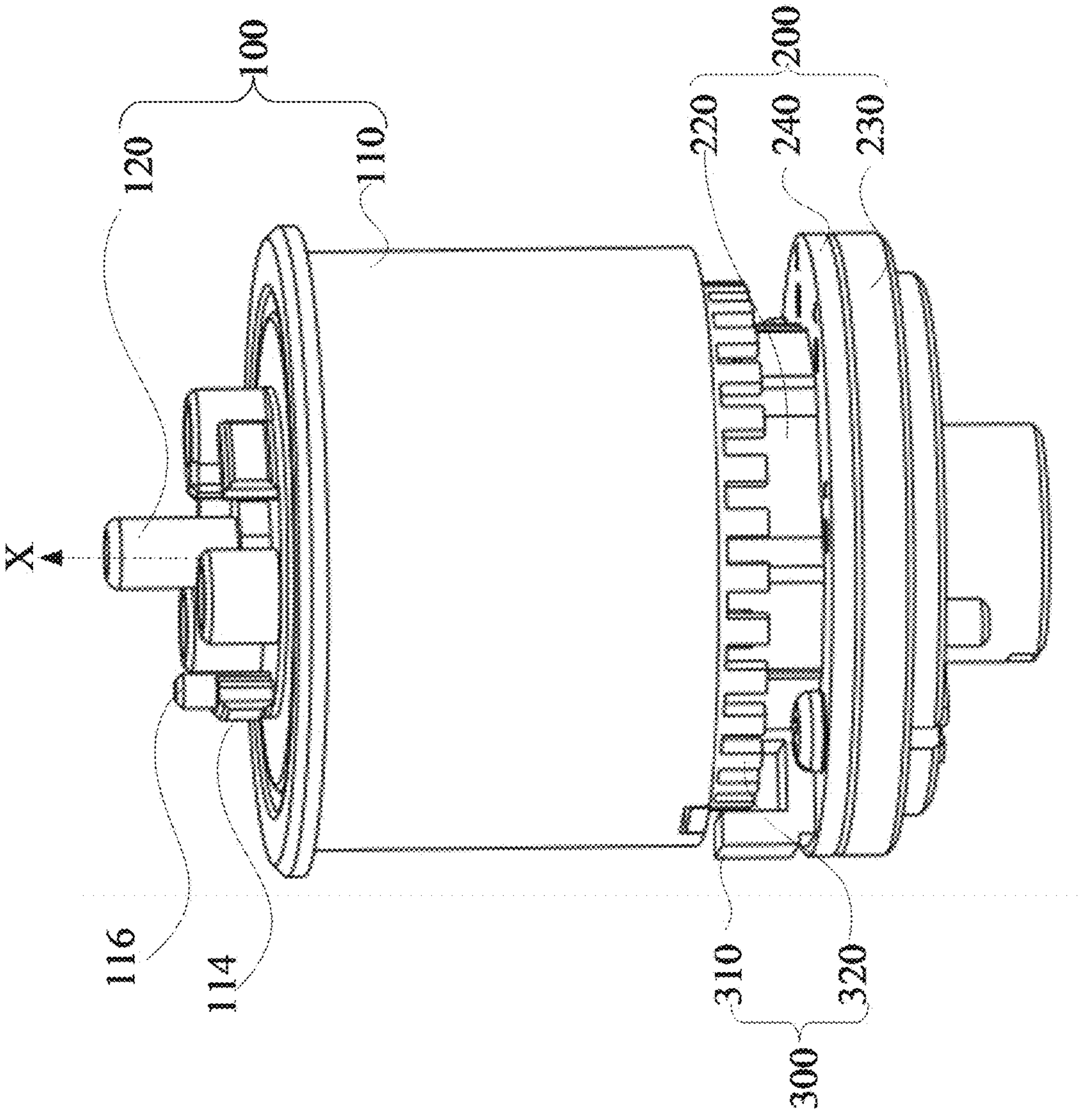
FIG. 2 is a structural schematic diagram of the galvanometer motor in FIG. 1.
Figure 3:
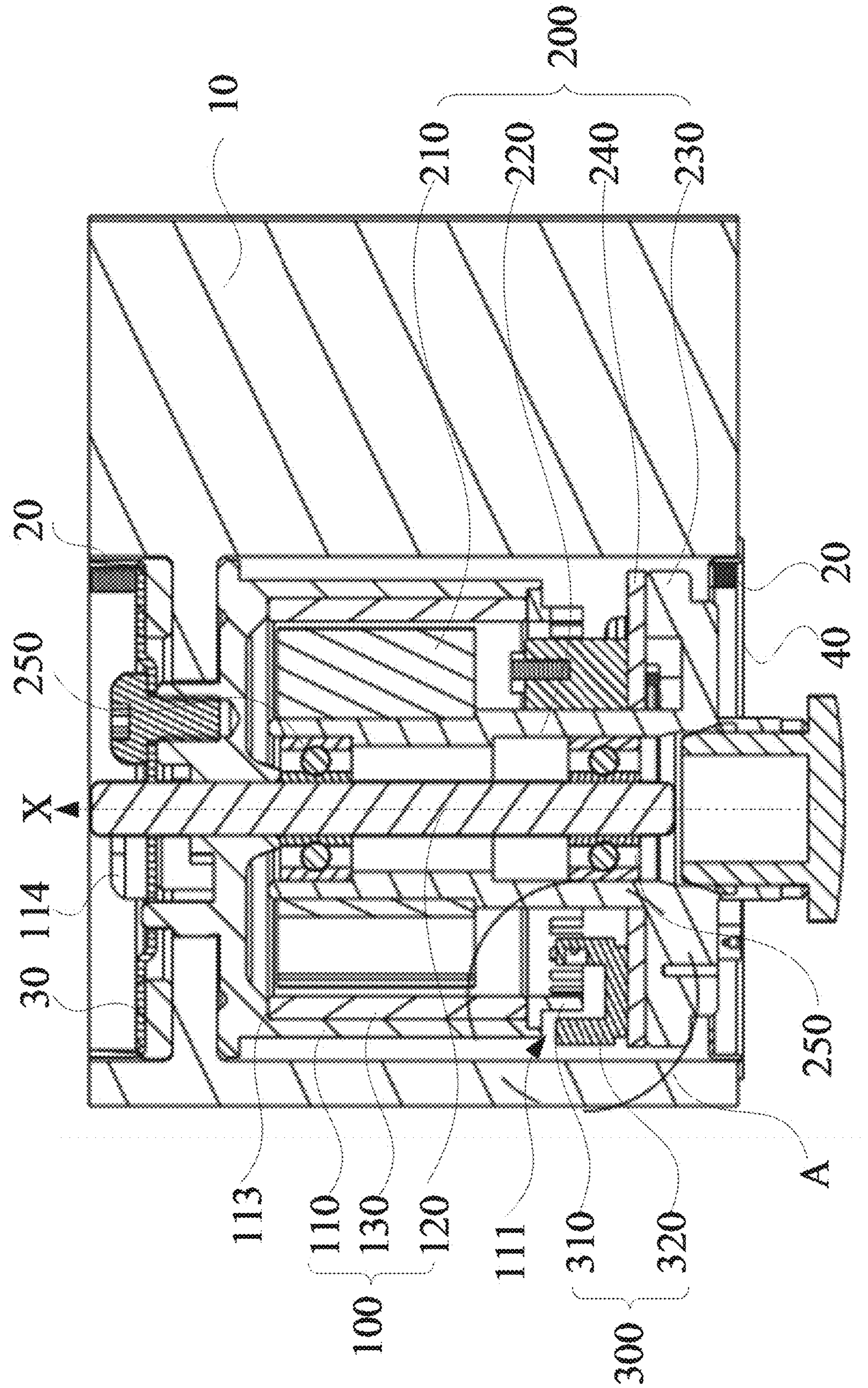
FIG. 3 is a sectional view of FIG. 1.
Figure 4:
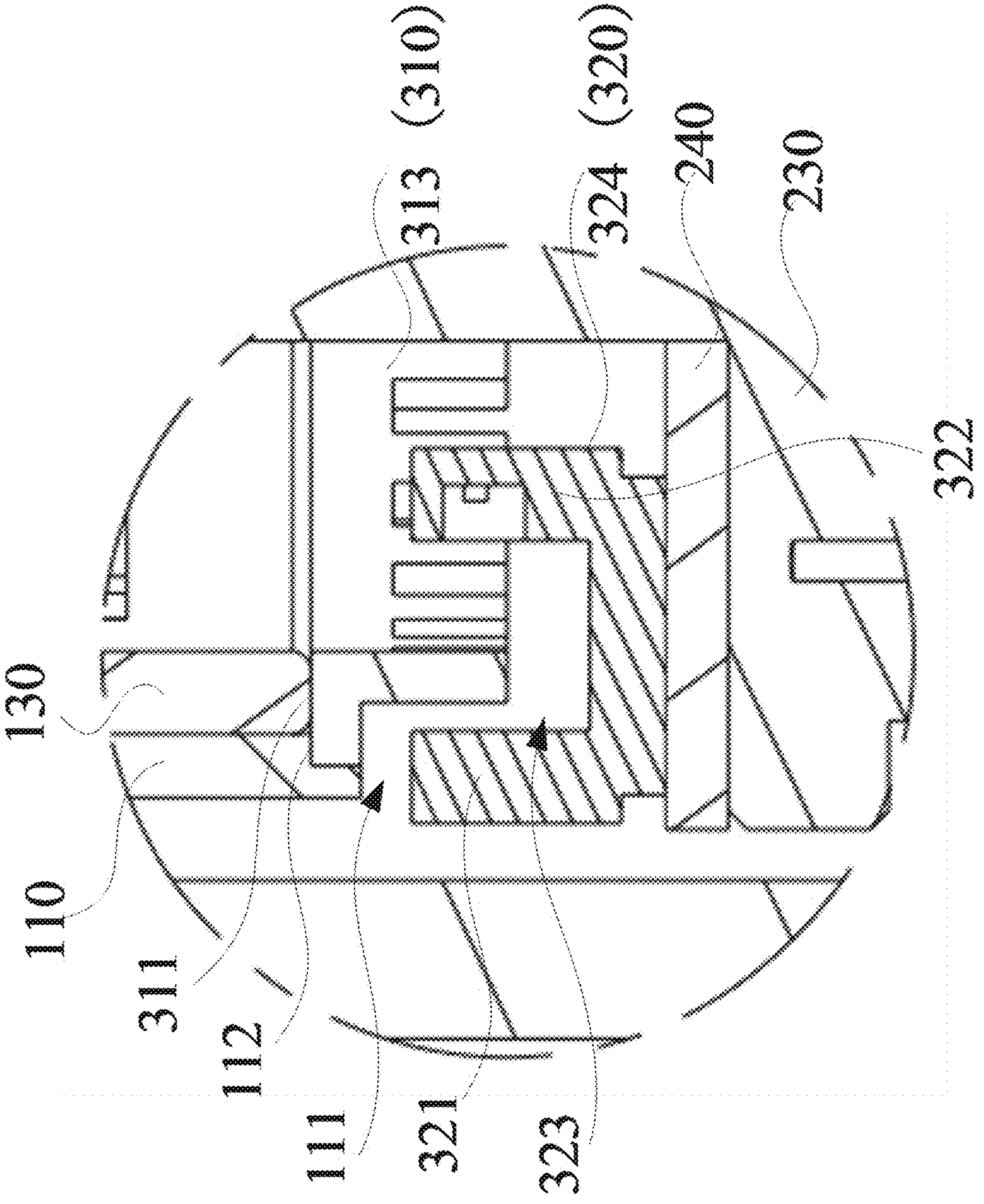
FIG. 4 is an enlarged view of part A in FIG. 3.

FIG. 2 is a structural schematic diagram of the galvanometer motor in FIG. 1. FIG. 3 is a sectional view of FIG. 1. FIG. 4 is an enlarged view of part A in FIG. 3.

Referring to FIGS. 2 to 4, the galvanometer motor provided in an embodiment includes a rotor assembly 100, a fixing structure 200, and an angular position sensor 300. The rotor assembly 100 includes a shell 110, a rotating shaft 120, and a magnetic pole 130. The shell 110 has a first end and a second end arranged opposite to each other. The second end of the shell 110 is open (opening 111). One end of the rotating shaft 120 is connected to the first end of the shell 110, and the other end of the rotating shaft 120 extends towards the opening 111. The magnetic pole 130 is mounted on the inner side wall of the shell 110, and there is a gap between the magnetic pole 130 and the rotating shaft 120.

The fixing structure 200 includes a stator assembly 210, a mounting sleeve 220, and a base 230. The mounting sleeve 220 is partially located inside the shell 110 and partially extends to the outside of the shell 110 through the opening 111. The mounting sleeve 220 is movably socketed with the rotating shaft 120. The stator assembly 210 is mounted on the outside of the mounting sleeve 220 inside the shell 110. There is a gap between the stator assembly 210 and the magnetic pole 130. The stator assembly 210 is used to generate a rotating magnetic field for driving the magnetic pole 130 to rotate. The base 230 is mounted on the mounting sleeve 220 outside the shell 110, and there is a gap between the base 230 and the second end of the shell 110.

The angular position sensor 300 is used to detect the angular position of the rotor assembly 100 and includes a trigger 310 and a sensing element 320. The trigger 310 is mounted on the second end of the shell 110, and the sensing element 320 is mounted on a side surface of the base 230 close to the shell 110.

In an embodiment, the stator assembly 210 generates a rotating magnetic field. The magnetic pole 130 rotates in the rotating magnetic field and drives the shell 110 to rotate. The trigger 310 of the angular position sensor 300 rotates synchronously with the shell 110. The sensing element 320 cooperates with the trigger 310 to obtain the angular position of the rotor assembly 100. Part of the mounting sleeve 220, the base 230, and the angular position sensor 300 are located outside the shell 110, so the shell 110 does not need to be enlarged to encase the angular position sensor 300, which helps reduce the outer diameter of the shell 110. The outer diameter of the galvanometer 10 is reduced, aiding in the miniaturization of the LiDAR, thereby reducing the outer diameter and volume of the galvanometer motor and LiDAR so that the LiDAR can be installed in devices with limited space.

In an embodiment, a first end of the shell 110 is located at the forward axis of the rotating shaft 120, and the second end of the shell 110 is located at the rearward axis of the rotating shaft 120. The shell 110 avoids radially housing the fixing structure 200, thus reducing the outer diameter of the shell 110, and the shell 110 does not cover the fixing structure 200 along the axis of the rotating shaft 120, which helps reduce the length of the shell 110, decreasing the volume and manufacturing difficulty of the shell 110, and promoting the lightweight and miniaturized design of the galvanometer motor.

In some embodiments, referring to FIGS. 3 and 4, the inner side wall of the second end of the shell 110 is provided with a first step 112. One end of the trigger 310 is mounted on the first step 112, and the other end of the trigger 310 extends outside the shell 110 towards the base 230. Precise positioning and mounting of the trigger 310 on the shell 110 using the first step 112, reducing assembly errors. The trigger 310 extends outside the shell 110, closer to the sensing element 320 on the base 230, thereby shortening the gap between the trigger 310 and the sensing element 320. They are set opposite each other without any device obstruction, which helps improve the accuracy of angular measurement and the sensitivity of the angular position sensor 300. The trigger 310 is mounted on the inner side wall of the shell 110, avoiding protruding radially from the rotating shaft 120 beyond the shell 110, thereby reducing the radial dimension of the galvanometer motor. The trigger 310 extends outside the shell 110 without occupying much of the internal space of the shell 110, aiding in reducing the volume of the shell 110.

In an embodiment, on the axis of the rotating shaft 120, ⅕ to ⅓ of the size of the trigger 310 is located inside the shell 110, with the majority of the structure located outside the shell 110, to reduce the diameter and length of the shell 110.

In an embodiment, the top surface and side walls of the trigger 310 respectively contact the surfaces of the first step 112, improving the bonding strength and ensuring the assembly stability of the trigger 310.

In an embodiment, the trigger 310 is fixed to the shell 110 by adhesion, welding, or snapping.

In an embodiment, referring to FIGS. 3 and 4, an end of the trigger 310 abutting the first step 112 extends towards the rotating shaft 120 to form a first supporting plane 311. The trigger 310 is not entirely adhered to the shell 110 in the radial direction of the rotating shaft 120, with part extending inside the shell 110 to form the first supporting plane 311, avoiding complete adhesion to the shell 110, which would increase the thickness of the shell 110. The inner side wall of the first end of the shell 110 is provided with a second step 113. One end of the magnetic pole 130 abuts the second step 113, and the other end abuts the first supporting plane 311, achieving the installation positioning of the magnetic ring and limiting the movement distance of the magnetic ring along the axis of the rotating shaft 120, reducing vibration of the magnetic ring along the axis of the rotating shaft 120.

In some embodiments, referring to FIG. 3, the magnetic pole 130 is an inner magnetized magnetic ring. Compared to multiple surrounding permanent magnets, the magnetic field strength produced by the inner magnetized magnetic ring is smaller, reducing the motor output density while satisfying the function of driving the galvanometer 10 to rotate, and helping to lower vibration noise.

In an embodiment, the magnetic ring is adhered to the inner side wall of the shell 110, eliminating the need for a magnetic yoke for indirect mounting on the shell 110, saving the cost of the magnetic yoke. It avoids the installation error of the magnetic yoke, reduces the cumulative error of the dimensional chain, and prevents vibration caused by assembly accuracy issues.

In an embodiment, the magnetic ring is annular. The magnetic ring is made of injection-molded magnetic material. Injection-molded magnetic rings have minimal magnetic leakage. The magnetic ring is magnetized in-mold or directionally magnetized.

In an embodiment, referring to FIG. 4, the sensing element 320 has a first barrier 321 and a second barrier 322 that are radially spaced along the rotating shaft 120. The interval between the first barrier 321 and the second barrier 322 forms a detection slot 323, in which part of the trigger 310 is located. The first barrier 321 and the second barrier 322 can block external light, impurities, or noise interference to the angular position sensor 300, helping to improve the detection accuracy of the angular position sensor 300.

In some embodiments, referring to FIGS. 2 and 3, the galvanometer motor includes a control board 240. The control board 240 is mounted on the side surface of the base 230 near the shell 110, the control board 240 is located outside the shell 110, avoiding occupying the internal cavity of the shell 110, preventing the shell 110 from increasing in volume, and facilitating the connection of the control board 240 with external devices. The control board 240 is detachably mounted on the base 230 by fasteners. The angular position sensor 300 is mounted on the side surface of the control board 240 away from the base 230, and electrically connected to the control board 240. The control board 240 receives the angular position of the rotor assembly 100 obtained by the angular position sensor 300 and sends it to an external control center. The control board 240 receives angle control commands sent by the external control center to control the rotation frequency and rotation angle of the rotor assembly 100 by controlling the alternating current of the stator assembly 210.

In an embodiment, the control board 240 is electrically connected to the stator assembly 210. The control board 240 is used for power supply and external communication of the galvanometer motor. The wiring ends of the stator windings of the stator assembly 210 are welded and fixed to the control board 240.

In some embodiments, referring to FIGS. 3 and 4, the angular position sensor 300 is a code disc, a magnetic sensor, or a photoelectric sensor.

In an embodiment, the angular position sensor 300 is a code disc, the trigger 310 is a reflecting part 313, and the sensing element 320 is a light-emitting part 324. The cooperation between the light-emitting part 324 and the reflecting part 313 can transmit angular position information. The reflecting part 313 includes multiple reflecting teeth extending towards the light-emitting part 324 and spaced from each other. The reflecting teeth are arranged in an arc line, with the arc line extending around the axis of the rotating shaft 120. There is an arc segment that can sequentially pass through all the reflecting teeth. The light-emitting part 324 is mounted on the base 230. The light-emitting part 324 and the reflecting part 313 are oppositely arranged. The light-emitting part 324 is used for emitting and receiving measuring light. The measuring light can be laser, infrared light, or ultraviolet light. When the reflecting part 313 rotates with the shell 110 relative to the base 230, the light-emitting part 324 obtains the rotation angle of the light-emitting part 324 relative to the reflecting part 313 by acquiring a quantity of teeth of the reflecting teeth swept by the measuring light.

Figure 15:
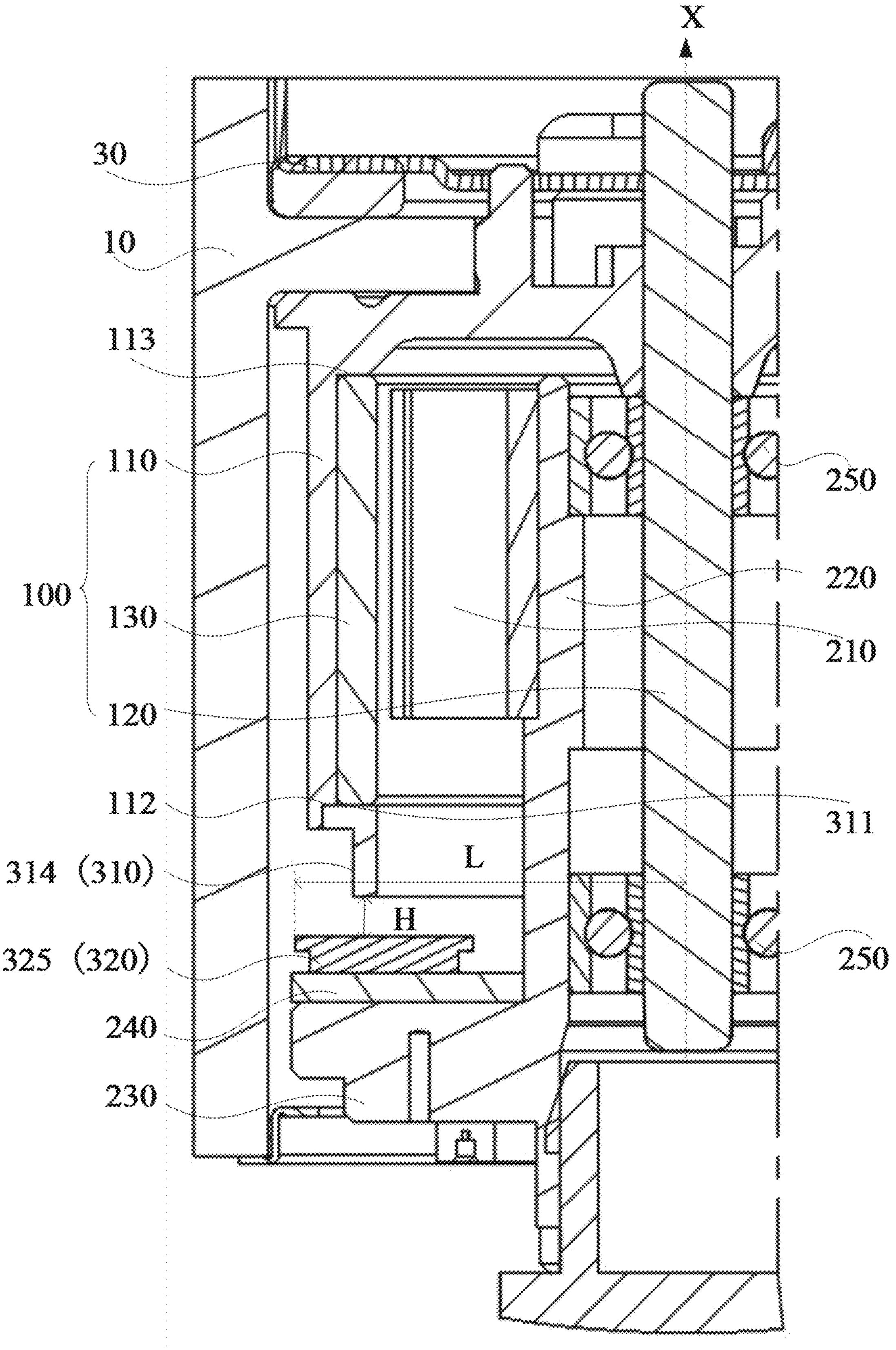
FIG. 15 is a partial view of FIG. 3.

FIG. 15 is a partial view of FIG. 3.

In an embodiment, referring to FIG. 15, the trigger 310 is a magnetic element 314, and the sensing element 320 is a magnetic encoder 325, with a gap H between the magnetic encoder 325 and the magnetic element 314. The magnetic element 314 rotates synchronously with the shell 110, and the magnetic encoder 325 is fixedly mounted on the control board 240. The magnetic element 314 rotates relative to the magnetic encoder 325. During rotation, the magnetic field signal sensed by the magnetic encoder 325 changes accordingly. The magnetic encoder 325 obtains the rotation information of the rotor assembly 100 relative to the base 230 by sensing the magnetic field signal of the magnetic element 314.

The magnetic encoder 325 is selected from a Hall sensor, MR (Magneto Resistance) sensor, or MI (Magneto Impedance) sensor. The magnetic element can be a magnet.

In an embodiment, a gap H is greater than or equal to 1.2 mm and less than or equal to 3 mm. By testing and adjusting the distance between the magnetic element 314 and the magnetic encoder 325, the magnetic encoder 325 is kept within the magnetic induction intensity range of 80 mT-120 mT.

In an embodiment, a maximum value of the gap H is 1.6 mm to 1.8 mm, meeting the magnetic induction intensity range of 80 mT-120 mT, and avoiding an excessively long overall length of the galvanometer motor caused by an excessive gap H.

Figure 5:
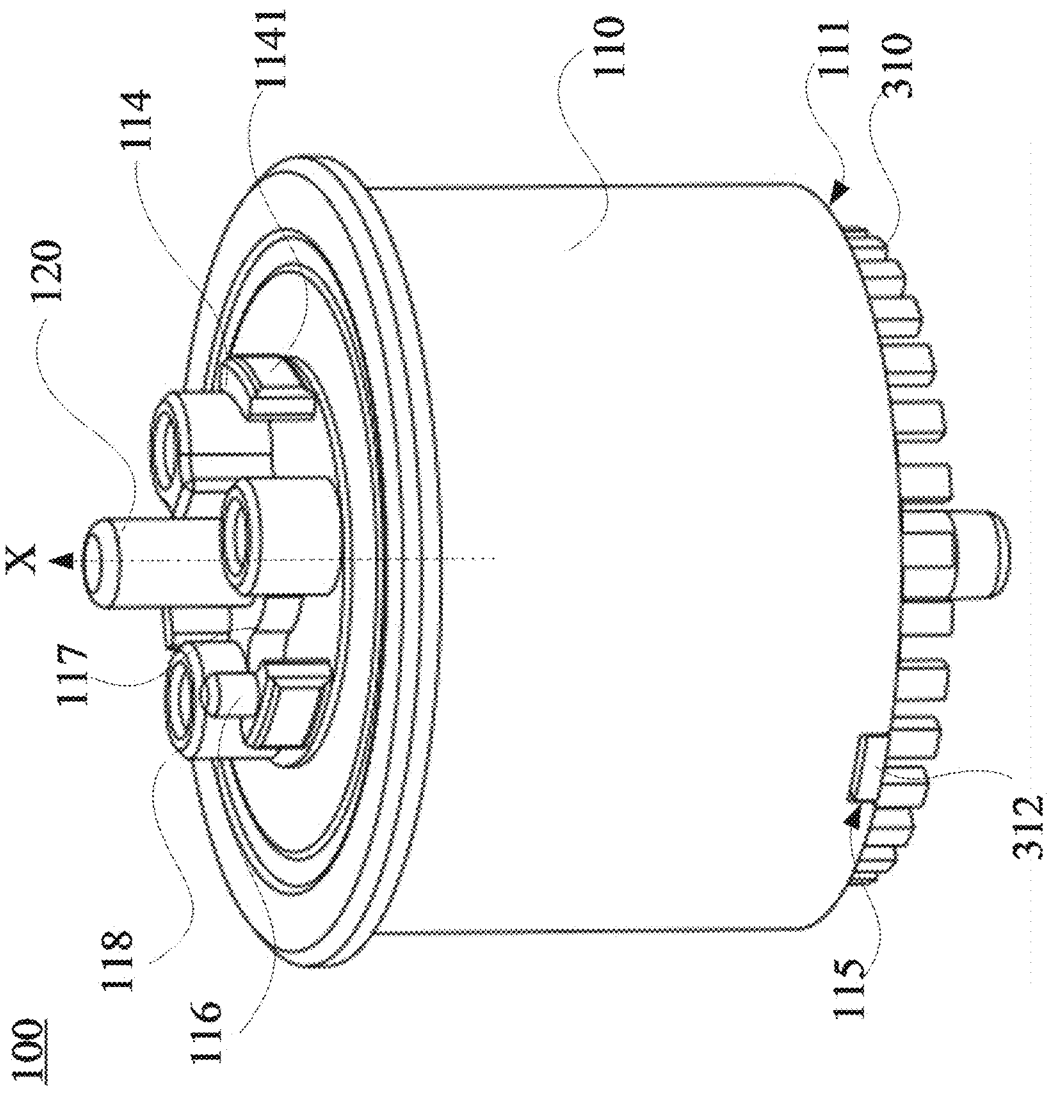
FIG. 5 is a structural schematic diagram of the rotor assembly of the galvanometer motor provided in an embodiment.

FIG. 5 is a structural schematic diagram of the rotor assembly of the galvanometer motor provided in an embodiment.

In some embodiments, referring to FIG. 5, a second end of the shell 110 is provided with a notch 115, and the trigger 310 is provided with a limiting block 312. The limiting block 312 cooperates with the notch 115 for limiting, achieving the positioning assembly of the trigger 310 and improving the assembly efficiency of the trigger 310.

In an embodiment, the side surface of the limiting block 312 away from the rotating shaft 120 and the outer side wall of the shell 110 are located on the same cylindrical surface, avoiding light leakage from the notch 115 of the shell 110, thereby preventing external light from affecting the detection accuracy of the angular position sensor 300.

In an embodiment, referring to FIGS. 3, 5, and 15, a maximum distance L between the sensing element 320 and the axis of the rotating shaft 120 is 90% to 110% of the outer diameter of the shell 110. Since the sensing element 320 is not accommodated inside the shell 110, the outer size of the sensing element 320 is larger than the outer diameter of the shell 110, facilitating flexible matching of the sensing element 320. A radial size of the sensing element 320 is expanded, increasing the cooperation space with the trigger 310, and improving the detection accuracy of the angular position sensor 300. The maximum distance L between the sensing element 320 and the axis of the rotating shaft 120 should be less than or equal to 110% of the outer diameter of the shell 110, avoiding an excessively large outer diameter of the galvanometer motor due to an excessively large distance L between the sensing element 320 and the axis of the rotating shaft 120. The maximum distance L between the sensing element 320 and the axis of the rotating shaft 120 should be greater than or equal to 90% of the outer diameter of the shell 110, preventing the sensing element 320 from being too close to the rotating shaft 120, which would result in an excessively short sensing circumference, potentially reducing detection accuracy and increasing the manufacturing difficulty of the angular position sensor 300.

In an embodiment, the base 230 and the shell 110 are coaxially arranged, with the outer diameter of the base 230 being 90% to 110% of the outer diameter of the shell 110. Since the base 230 is not accommodated inside the shell 110, the outer size of the base 230 is larger than the outer diameter of the shell 110, facilitating the assembly space of the base 230. The outer diameter of the base 230 should be less than or equal to 110% of the outer diameter of the shell 110, avoiding an excessively large outer diameter of the galvanometer motor due to an excessively large outer diameter of the base 230. The outer diameter of the base 230 should be greater than or equal to 90% of the outer diameter of the shell 110, preventing the base 230 from only being able to accommodate smaller angular position sensors 300 and lacking assembly space, which would cause accuracy issues or increased manufacturing costs of smaller angular position sensors 300.

In an embodiment, the control board 240 and the shell 110 are coaxially arranged, with the outer diameter of the control board 240 being 90% to 110% of the outer diameter of the shell 110. Since the control board 240 is not accommodated inside the shell 110, the outer size of the control board 240 is larger than the outer diameter of the shell 110, facilitating the wiring space of the control board 240. The outer diameter of the control board 240 is less than or equal to 110% of the outer diameter of the shell 110, avoiding an excessively large outer diameter of the galvanometer motor due to an excessively large outer diameter of the control board 240. The outer diameter of the control board 240 is greater than or equal to 90% of the outer diameter of the shell 110, preventing the control board 240 from only being able to accommodate smaller angular position sensors 300 and lacking assembly space, which would cause accuracy issues or increased manufacturing costs of smaller angular position sensors 300.

In an embodiment, referring to FIGS. 1, 2, and 5, the outer end surface of the first end of the shell 110 is provided with a positioning block 114, which is used for cooperating with the positioning of the galvanometer 10 of the LiDAR. The positioning block 114 has a gap with the rotating shaft 120, so the distance between the positioning block 114 and the axis of the rotating shaft 120 is greater than the outer diameter of the rotating shaft 120. The galvanometer 10 is assembled to the shell 110 by sleeving the positioning block 114. Compared to the galvanometer 10 being assembled to the shell 110 by sleeving the rotating shaft 120, the axis hole of the galvanometer 10 is larger, making it easier to process and form.

In an embodiment, the positioning block 114 has a positioning arc surface 1141 extending along the axis of the rotating shaft 120, allowing for surface contact between the positioning block 114 and the galvanometer 10, and providing a large contact area and stable and reliable assembly.

In an embodiment, a quantity of positioning blocks 114 is three, and the positioning arc surfaces 1141 of the three positioning blocks 114 are located on the same cylindrical surface, ensuring that the galvanometer 10 is uniquely sleeved on the cylindrical surface determined by the three positioning blocks 114, and providing precise and reliable assembly of the galvanometer 10.

If a quantity of positioning blocks 114 exceeds three, the galvanometer 10 can be sleeved on the same cylindrical surface. If a quantity of positioning blocks 114 exceeds three, it would result in over-constraint, requiring high processing accuracy for the positioning blocks 114. If a quantity of positioning blocks 114 exceeds three and they cannot determine a circle, they would interfere with each other, making it difficult for the galvanometer 10 to be sleeved on more than three positioning blocks 114 simultaneously.

In an embodiment, to facilitate the precise sleeving of the galvanometer 10 onto the shell 110, the outer end surface of the first end of the shell 110 is provided with a guide pin 116. The galvanometer 10 has a guide hole. With the guiding cooperation of the guide pin 116 and the guide hole, the galvanometer 10 can be precisely sleeved onto the shell 110 in a predetermined direction and position.

In some embodiments, referring to FIGS. 3 and 5, the rotating shaft 120 and the shell 110 are integrally formed, ensuring the coaxiality of the rotating shaft 120 and the shell 110, avoiding assembly errors between the rotating shaft 120 and the shell 110, reducing the end face runout of the shell 110 and vibration noise caused by eccentricity, and facilitating the low-vibration and low-noise operation of the outer rotor motor.

The rotating shaft 120 and the shell 110 are made of aluminum alloy, which has good rigidity and is lighter in weight compared to metals like steel or copper, reducing the output density requirements of the galvanometer motor, and consequently reducing vibration noise by lowering the magnetic field strength.

In an embodiment, the rotating shaft 120 is manufactured separately from the shell 110 and then connected to each other, reducing the manufacturing difficulty of the rotating shaft 120 and the shell 110.

Figure 6:
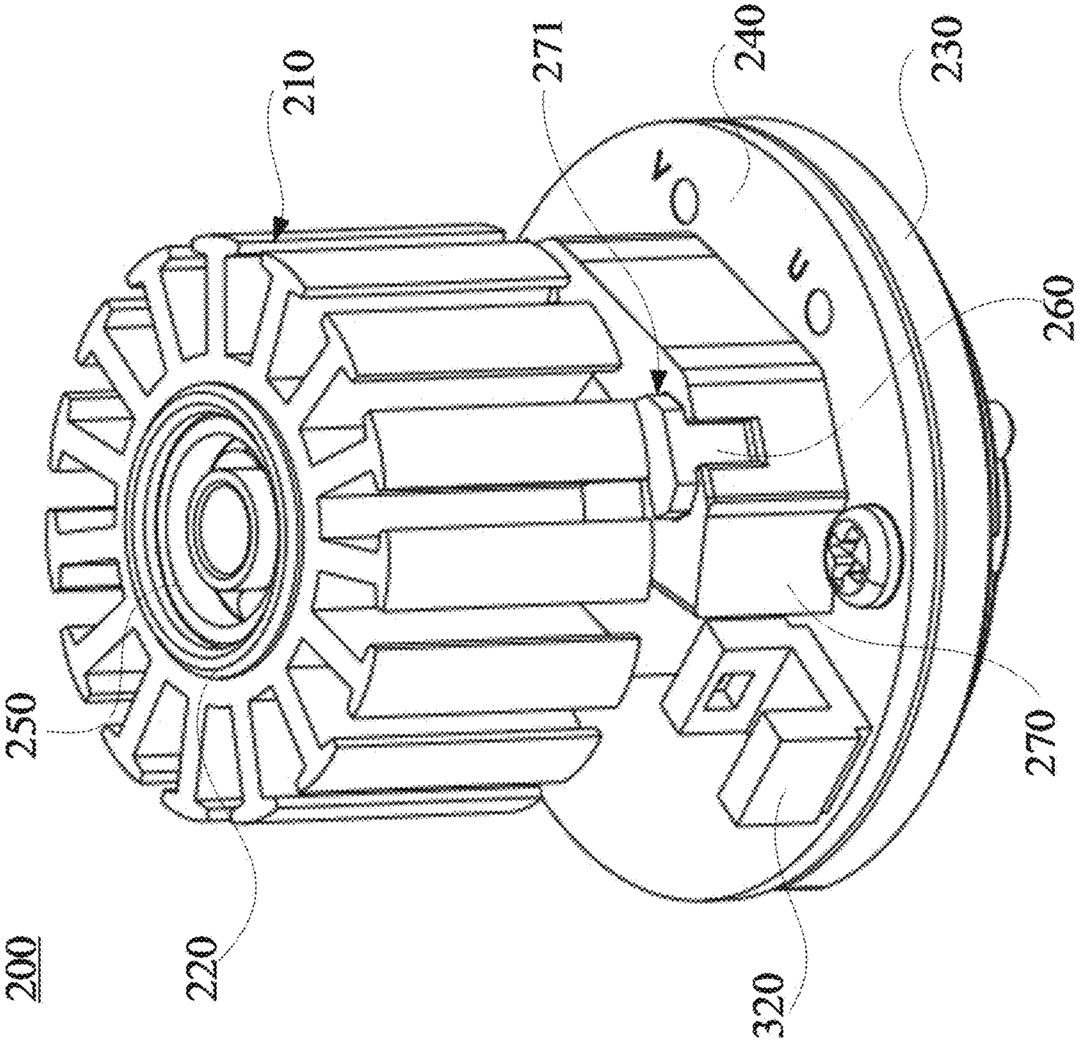
FIG. 6 is a structural schematic diagram of the fixing structure of the galvanometer motor provided in an embodiment.

FIG. 6 is a structural schematic diagram of the fixing structure of the galvanometer motor provided in an embodiment.

In some embodiments, referring to FIG. 6, the fixing structure 200 includes a Hall element 260, which is arranged through the control board 240. The base 230 has positioning holes for positioning the Hall element 260. The base 230 is provided with a support block 270 that penetrates through the control board 240. The support block 270 has a mounting slot 271 for mounting the Hall element 260. The bottom of the mounting slot 271 is provided with the positioning holes.

In an embodiment, the stator winding is a three-phase winding, and the motor of the fixing structure 200 includes three groups of Hall elements 260. In an embodiment, each group of Hall elements 260 includes one Hall element 260, facilitating the miniaturization and lightweight design of the galvanometer motor. In an embodiment, to improve the speed accuracy of the galvanometer motor, each group of Hall elements 260 includes 2 or 3 Hall elements 260. The three groups of Hall elements 260 are distributed at intervals around the axis of the rotating shaft 120. The Hall element 260 is used to sense the commutation position of the rotor assembly 100. The control board 240 is electrically connected to the Hall element 260 and the three-phase winding. The control board 240 is used to control the commutation of the three-phase winding based on the detection results of the Hall element 260, so that the three-phase winding generates a rotating magnetic field that operates at a certain speed.

In an embodiment, the copper wires of the three-phase winding are used to generate the magnetic force to drive the magnetic pole 130 to rotate, and three star-connected phase wires are led out. The three phase wires are U phase wire, V phase wire, and W phase wire. The three groups of Hall elements 260 respectively correspond to the three phase wires. The signals detected by the three groups of Hall elements 260 are A signal, B signal, and C signal, respectively. Each signal is represented by a binary number 0 or 1. Normally, there will be no combinations of 000 and 111. There are six possible combinations of A signal, B signal, and C signal, each corresponding to a physical position of the rotor assembly 100. After the Hall element 260 sends the physical position information of the rotor assembly 100 to the control board 240, the control board 240 can change the current direction in the three-phase winding to achieve brushless commutation.

In an embodiment, the control board 240 is provided with a wireless communication module to enable the control board 240 to communicate with external components through the wireless communication module.

In some embodiments, the control board 240 is provided with at least one of a motor driver, a temperature sensor, a voltage detection circuit, and a current detection circuit to ensure the operational reliability of the control board 240.

In some embodiments, referring to FIGS. 3 and 6, the fixing structure 200 includes a bearing 250. The bearing 250 is mounted inside the mounting sleeve 220, and the rotating shaft 120 is rotatably supported inside the mounting sleeve 220 by the bearing 250. The bearing 250 supports the rotating shaft 120, limiting the radial movement of the rotating shaft 120 and ensuring the stability of the axis of the rotating shaft 120.

In an embodiment, there are two bearings 250, which are distributed at intervals along the axis of the rotating shaft 120. One bearing 250 is located on the inner side wall of the first end of the shell 110, and the other bearing 250 is located outside the shell 110, at the side of the second end of the shell 110 away from the first end. Thus, the two bearings 250 jointly and stably support the rotating shaft 120.

In an embodiment, at least one of the bearings 250 and the rotating shaft 120 is made of ceramic material. Ceramics have higher processing accuracy, mechanical strength, and better wear resistance and corrosion resistance. In some embodiments, the rotating shaft 120 has a rotating body with a diamond coating on its surface, making the surface of the rotating shaft 120 smooth and highly wear-resistant, allowing the rotating shaft 120 to rotate smoothly and reducing noise caused by wear. In an embodiment, the rotating body material is a material with certain rigidity, such as metal or ceramic, and the material of the rotating body is the same as that of the bearing 250.

In an embodiment, the roughness of the hole wall of the bearing 250 and the surface of the rotating shaft 120 is less than or equal to 0.1 microns, effectively reducing the friction between the rotating shaft 120 and the bearing 250, and reducing vibration noise.

Figure 7:
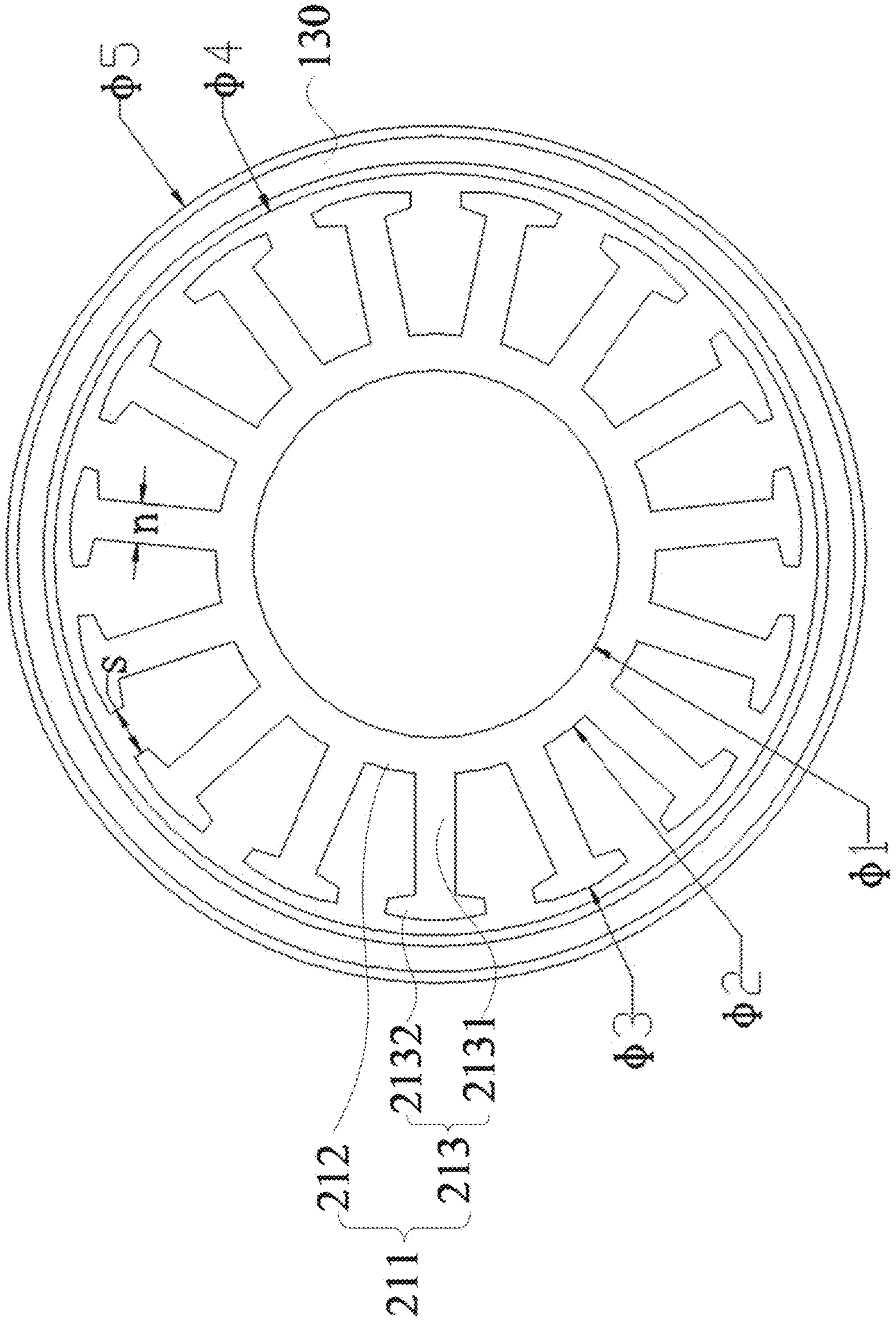
FIG. 7 is a schematic diagram of the projection of the stator lamination and the magnetic pole of the galvanometer motor on the axis of the rotating shaft provided in an embodiment.

In an embodiment, referring to FIGS. 3 and 7, a quantity of poles of the magnetic pole 130 is 20, and a quantity of slots of the stator assembly 210 is 15. In an embodiment, a quantity of poles of the magnetic pole 130 is 10, and a quantity of slots of the stator assembly 210 is 15.

In an embodiment, a quantity of poles of the magnetic pole 130 is 14, and a quantity of slots of the stator assembly 210 is 12, with a pole-slot combination of 14P12S. The measured vibration noise is high and unsatisfactory. After preliminary calculation and screening, this application provides two pole-slot combinations: 10P15S, where a quantity of poles of the magnetic pole 130 is 10, and a quantity of slots of the stator assembly 210 is 15; and 20P15S, where a quantity of poles of the magnetic pole 130 is 20, and a quantity of slots of the stator assembly 210 is 15.

FIG. 8 is a comparison table of the minimum space harmonic order of different pole-slot combinations of the galvanometer motor. FIG. 9 is a comparison table of the vibration displacement caused by the main harmonic force wave of the galvanometer motor with different pole-slot combinations.

Referring to FIGS. 8 and 9, in an embodiment, the minimum space harmonic order of the pole-slot combinations of 10P15S and 20P15S is large, reducing vibration noise.

Referring to FIG. 9, according to a model of vibration amplitude, simulation data, and comparative analysis of the vibration displacement caused by the main harmonic force wave of different pole-slot combinations, compared to the conventional scheme of 14P12S, the pole-slot combinations of 10P15S and 20P15S can greatly reduce the vibration displacement caused by the main harmonic force wave. Since the deformation of the stator assembly 210 is inversely proportional to the fourth power of the force wave frequency, and the deformation of the stator assembly 210 is inversely proportional to the fourth power of the force wave frequency, the stator assembly 210 with the pole-slot combination of 14P12S has the largest deformation. Therefore, the vibration of the stator assembly 210 with the pole-slot combinations of 10P15S and 20P15S is smaller than that of the conventional scheme of 14P12S.

Figure 10A:
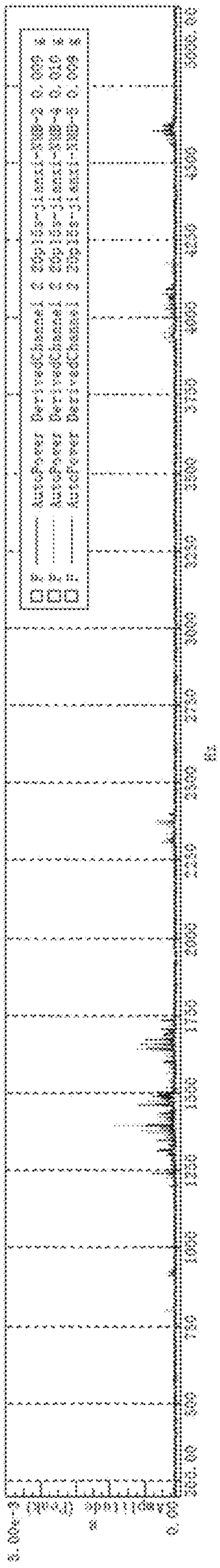
FIG. 10A is a schematic diagram of the noise effect of the galvanometer motor of 20P15S with different pole-slot combinations.
Figure 10B:
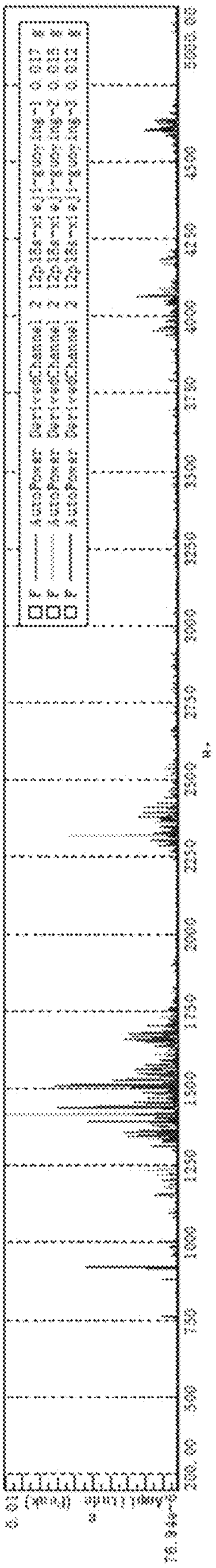
FIG. 10B is a schematic diagram of the noise effect of the galvanometer motor of 10P15S with different pole-slot combinations.

FIG. 10A is a schematic diagram of the noise effect of the galvanometer motor of 20P15S with different pole-slot combinations. FIG. 10B is a schematic diagram of the noise effect of the galvanometer motor of 10P15S with different pole-slot combinations.

In the noise test experiment, the noise of the galvanometer motor with a 20P15S pole-slot combination is the smallest among the galvanometer motors with 10P15S and 20P15S pole-slot combinations. Referring to FIG. 9, the smaller the deformation of the stator assembly 210, the smaller the noise. When the deformation of the stator assembly 210 is controlled within a preset range, such as the fourth power reciprocal of the force wave frequency of the galvanometer motors with 10P15S and 20P15S pole-slot combinations being 16.12 and 10.97 respectively, and the deformations of the two are similar and very small, almost no difference exists. In an embodiment, reducing from 10 to 0.1 and 0.15 respectively. The difference can be ignored. In an embodiment, the influence of slot torque on noise is greater than that of deformation. The larger the slot torque, the greater the noise. The slot torque is related to the least common multiple of a quantity of poles and a quantity of slots. The larger the least common multiple of a quantity of poles and a quantity of slots, the greater the slot torque. The slot torque of the 20P15S pole-slot combination is smaller than that of the 10P15S pole-slot combination. Considering the factors of deformation and a quantity of slots, the noise of the motor with the 20P15S pole-slot combination is the smallest. FIG. 10A shows the noise effect of 20P15S, and FIG. 10B shows the noise effect of 10P15S. The horizontal axis in the figure represents the vibration frequency of the motor, and the vertical axis represents the noise level of the motor. The noise of 20P15S is smaller than that of 10P15S.

FIG. 7 is a schematic diagram of the projection of the stator lamination and the magnetic pole of the galvanometer motor on the axis of the rotating shaft provided in an embodiment.

In an embodiment, referring to FIG. 7, the stator assembly 210 includes a stator lamination 211 and a stator winding. The stator lamination 211 includes a stator yoke 212 and multiple stator teeth 213. The stator yoke 212 is annular and coaxially arranged with the rotating shaft 120. The multiple stator teeth 213 are connected to the outer side of the stator yoke 212 and are uniformly distributed at equal intervals along the circumferential direction of the stator yoke 212. The stator winding is wound on the multiple stator teeth 213.

Figure 11:
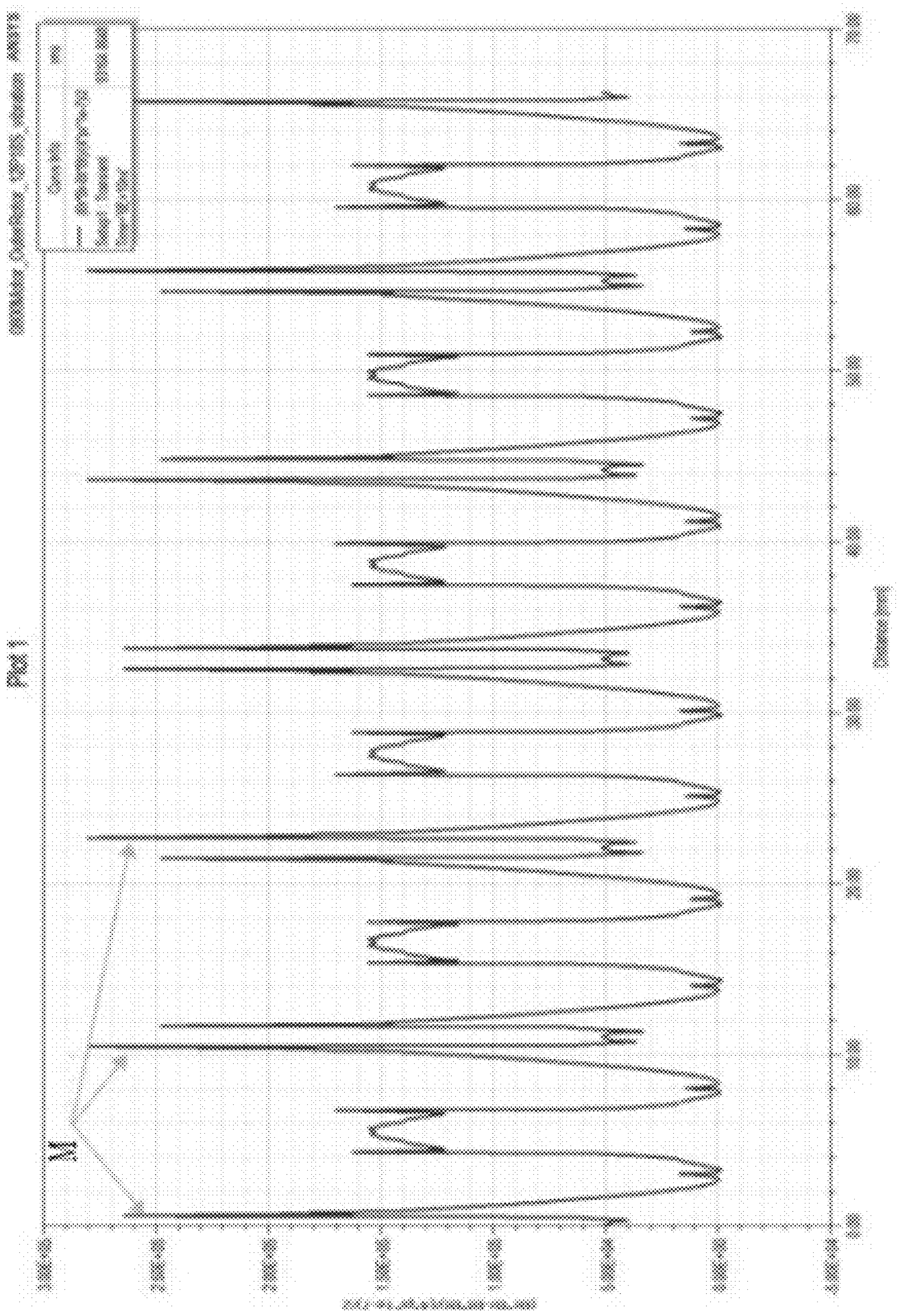
FIG. 11 is the force density waveform before optimization of the galvanometer motor with a 20P15S pole-slot combination.
Figure 12:
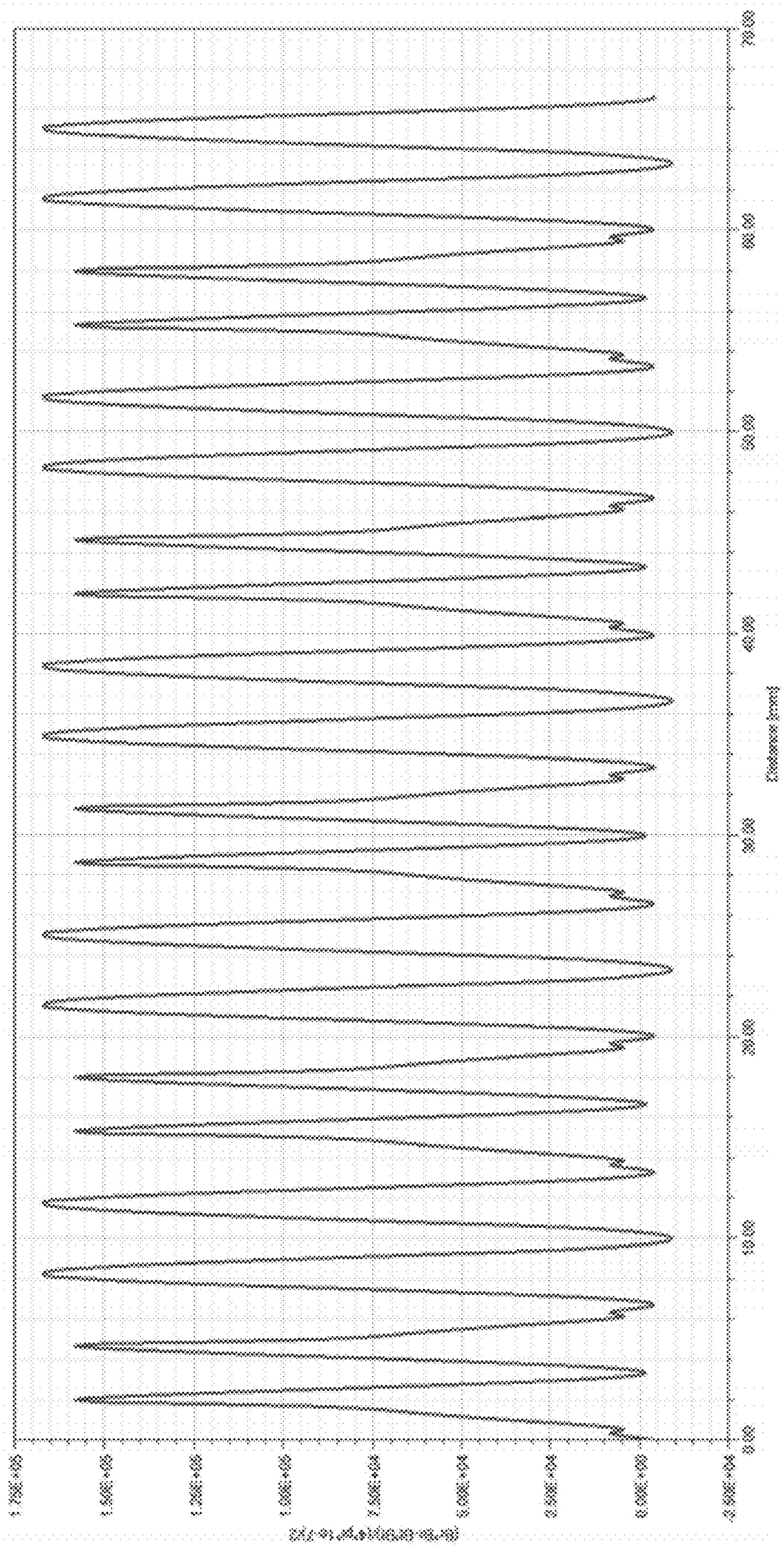
FIG. 12 is the force density waveform after optimization of the galvanometer motor with a 20P15S pole-slot combination.

FIG. 11 is the force density waveform before optimization of the galvanometer motor with a 20P15S pole-slot combination. FIG. 12 is the force density waveform after optimization of the galvanometer motor with a 20P15S pole-slot combination.

In an embodiment, the force density waveform of the motor is simulated, as shown in FIG. 11. The position indicated by the arrow M in FIG. 11 shows that the force density waveform has many burrs. Referring to FIG. 7, the inner diameter φ1 of the stator yoke 212 is from 8 mm to 11 mm for eccentric optimization. After optimizing the eccentric distance, the force density waveform of the motor is shown in FIG. 12, with the burrs eliminated, reducing the noise caused by electromagnetic force.

In an embodiment, referring to FIG. 7, the stator teeth 213 include a tooth root 2131 and a tooth top 2132 sequentially connected along the radial direction of the stator yoke 212. The tooth root 2131 is connected to the end of the stator yoke 212.

In an embodiment, to reduce tooth magnetic flux density, the size n of the tooth root 2131 along the circumferential direction of the stator yoke 212 is limited to 1.0 mm to 1.2 mm, reducing vibration noise.

In an embodiment, the size n of the tooth root 2131 along the circumferential direction of the stator yoke 212 is 1.0 mm, 1.1 mm, or 1.2 mm.

In an embodiment, referring to FIG. 7, the slot torque causes torque fluctuations in the outer rotor motor, generating vibration and noise. To reduce slot torque, the interval size s between adjacent tooth tops 2132 along the circumferential direction of the stator yoke 212 is limited to 1.3 mm to 1.5 mm, reducing slot torque.

In an embodiment, the interval size s between adjacent tooth tops 2132 along the circumferential direction of the stator yoke 212 is 1.3 mm, 1.4 mm, or 1.5 mm.

In an embodiment shown in FIG. 7, the outer diameter φ2 of the stator yoke 212 is 11.5 mm to 12.5 mm, ensuring the stator yoke 212 has a certain thickness and rigidity while reducing the weight of the stator yoke 212.

In an embodiment, the outer diameter φ2 of the stator yoke 212 is 11.5 mm, 12.0 mm, 12.3 mm, or 12.5 mm.

In an embodiment, the outer diameter φ3 of the tooth top 2132 is 20 mm to 20.5 mm, limiting the maximum outer diameter of the stator assembly 210, enabling the miniaturization of the galvanometer motor and LiDAR.

In an embodiment, the outer diameter φ3 of the tooth top 2132 is 20 mm, 20.2 mm, 20.4 mm, or 20.5 mm.

In some embodiments, referring to FIG. 7, the inner diameter 44 of the magnetic pole 130 is 20.7 mm to 21 mm, providing sufficient space to accommodate the stator assembly 210. The outer diameter φ5 of the magnetic pole 130 is 23 mm to 24 mm, reducing the volume of the rotor assembly 100 and enabling the miniaturization of the LiDAR.

In an embodiment, the inner diameter 44 of the magnetic pole 130 is 20.7 mm, 20.8 mm, 20.9 mm, or 21 mm. The outer diameter φ5 of the magnetic pole 130 is 23 mm, 23.4 mm, 23.6 mm, 23.8 mm, or 24 mm.

The aforementioned galvanometer motor can be applied to LiDAR, with the galvanometer 10 mounted on the shell 110. In an embodiment, the galvanometer 10 and the shell 110 are connected by screws, snaps, or adhesives. In an embodiment, the shell 110 has a first connection hole, and the galvanometer 10 has a second connection hole corresponding to the position of the first connection hole. Fasteners pass through the first connection hole and the second connection hole, fixing the galvanometer 10 on the shell 110.

In an embodiment, an outer end surface of the first end of the shell 110 is provided with a connecting block 118 having the first connection hole. There are multiple connecting blocks 118, such as three, uniformly distributed along the circumferential direction of the rotating shaft 120, facilitating uniform connection force between the shell 110 and the galvanometer 10, and allowing them to rotate smoothly. The connecting blocks 118 increase the hole wall area of the first connection hole, improving the connection area and connection force between the galvanometer 10 and the shell 110.

In an embodiment, the outer end surface of the first end of the shell 110 is further provided with a reinforcing block 117, with the connecting blocks 118 respectively connected to the reinforcing block 117, making the multiple connecting blocks 118 integrated through the reinforcing block 117, and improving the overall strength of the shell 110 and its load-bearing capacity.

When the aforementioned galvanometer motor is applied to LiDAR and the LiDAR is installed above the cab, due to the small size of the galvanometer motor, it can be installed inside the cab, taking up little space and keeping the cab spacious.

Figure 13:
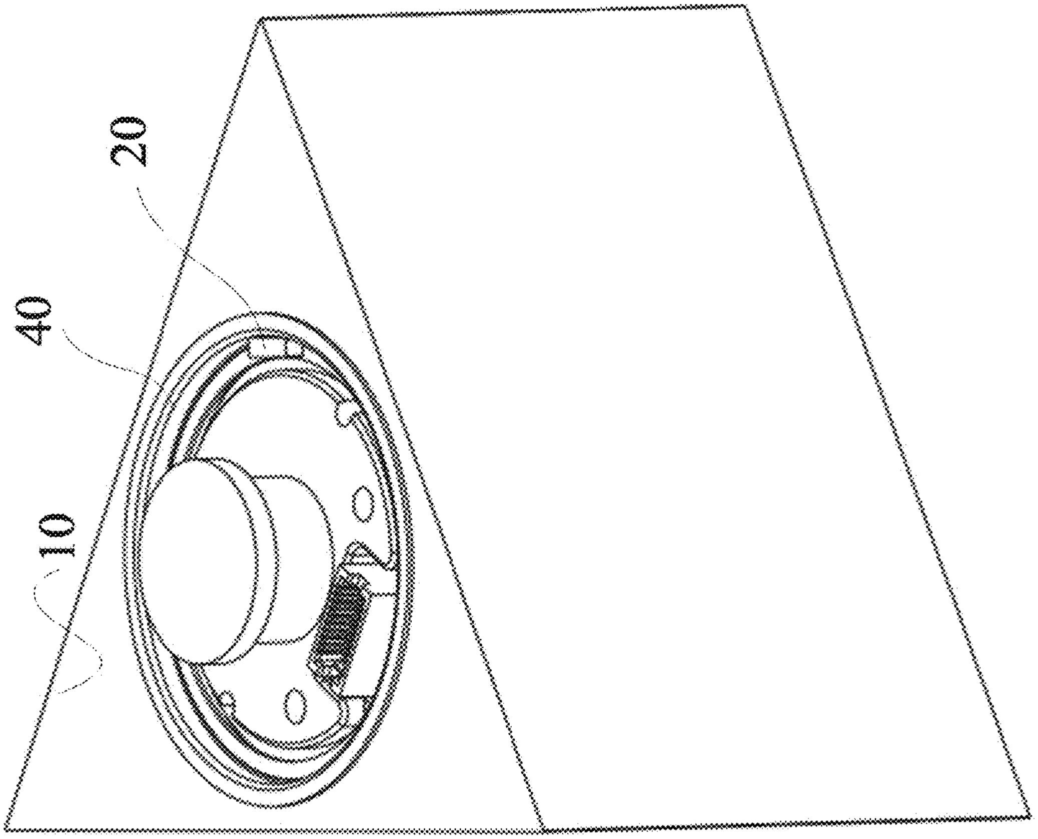
FIG. 13 is another perspective view of the LiDAR provided in an embodiment.
Figure 14:
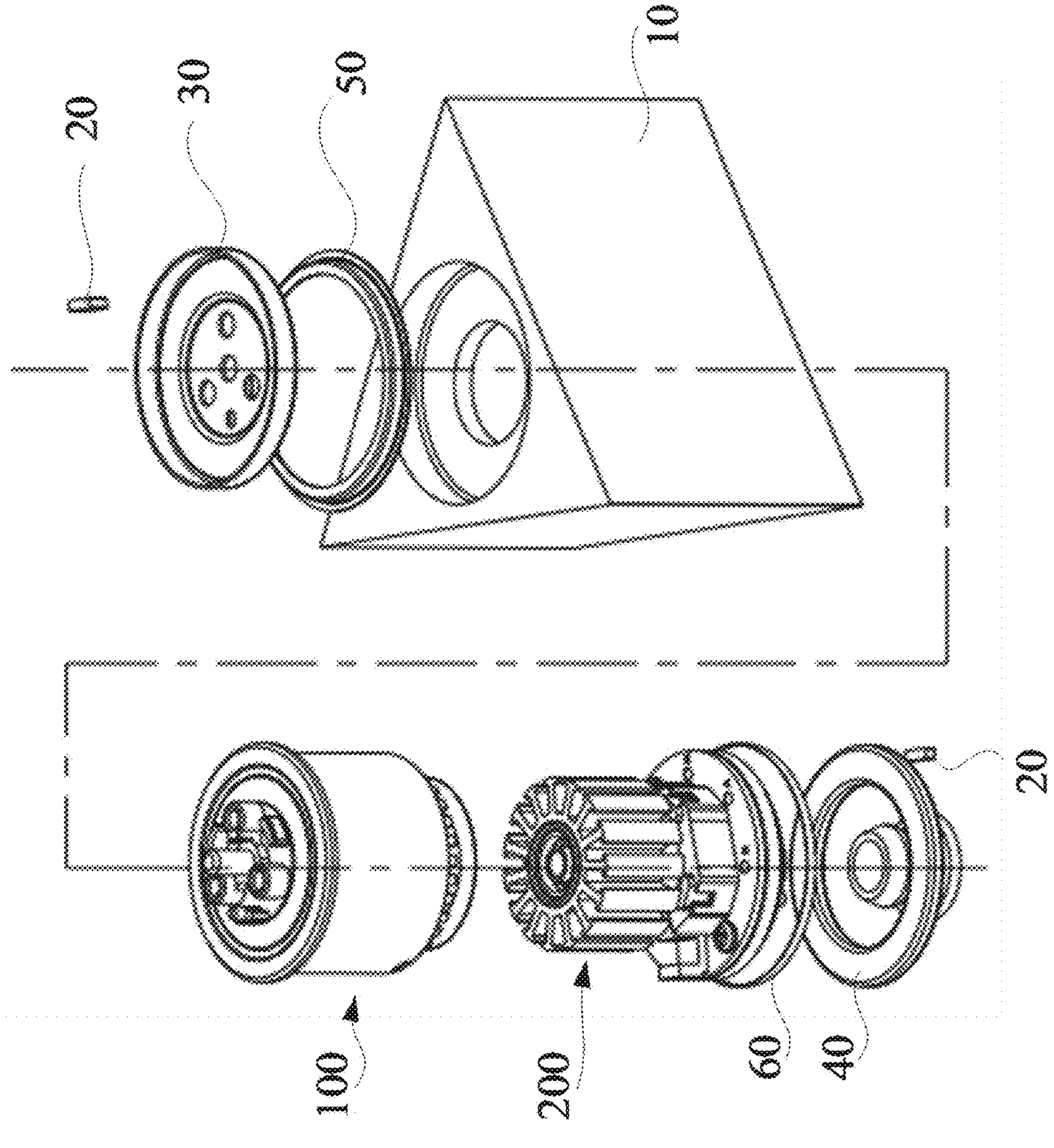
FIG. 14 is an exploded view of the LiDAR provided in an embodiment.

FIG. 13 is another perspective view of the LiDAR provided in an embodiment. FIG. 14 is an exploded view of the LiDAR provided in an embodiment.

In an embodiment, referring to FIGS. 1, 13, and 14, the LiDAR includes a dynamic balancing element 20, a first end cover 30, and a second end cover 40. The galvanometer 10 is sleeved on the shell 110 and the base 230. The first end cover 30 is mounted on one end of the galvanometer 10, and the second end cover 40 is mounted on the other end of the galvanometer 10.

The dynamic balancing element 20 is fixedly bonded to the first end cover 30 and/or the second end cover 40 using adhesive with preset mass, or the dynamic balancing element 20 is welded to the first end cover 30 and/or the second end cover 40 using solder with preset mass. In other words, the dynamic balancing element 20 can be installed on only the first end cover 30 or the second end cover 40, or simultaneously on both the first end cover 30 and the second end cover 40.

A combination of gradient dynamic balancing blocks and adhesive or solder for dynamic balancing design is used. In an embodiment, if the required dynamic balance for the galvanometer motor at the first end of the shell 110 is 53 g, and the required dynamic balance at the second end of the shell 110 is 103 g, then a 50 g dynamic balancing element 20 is selected for the galvanometer 10 near the first end of the shell 110 and bonded to the first end cover 30. Then, 3 g of adhesive or solder is added for dynamic balancing. Similarly, a 100 g dynamic balancing element 20 is selected for the galvanometer 10 near the second end of the shell 110 and bonded to the second end cover 40, followed by an additional 3 g of adhesive or solder for dynamic balancing, achieving precise dynamic balancing.

In an embodiment, the adhesive is UV glue.

In an embodiment, the galvanometer 10 is sleeved on the shell 110 and the outer part of the angular position sensor 300. The first end cover 30 and the second end cover 40 respectively seal the two ends of the gap between the galvanometer 10 and the shell 110, effectively preventing external light from interfering with the operation of the angular position sensor 300.

In an embodiment, referring to FIG. 14, a first sleeve 50 is arranged between the first end cover 30 and the galvanometer 10 to protect the galvanometer 10. A second sleeve 60 is arranged between the second end cover 40 and the galvanometer 10 to protect the galvanometer 10.

What is claimed is:

1. A galvanometer motor, comprising:

a rotor assembly, wherein the rotor assembly comprises a shell, a rotating shaft, and a magnetic pole, the shell has a first end and a second end that are arranged opposite to each other, the second end of the shell has an opening, one end of the rotating shaft is connected to the first end of the shell, the other end of the rotating shaft extends towards the opening, the magnetic pole is mounted on an inner side wall of the shell, and there is a gap between the magnetic pole and the rotating shaft;

a fixing structure, wherein the fixing structure comprises a stator assembly, a mounting sleeve, and a base, the mounting sleeve is partially located inside the shell and partially extends to outside of the shell through the opening, the mounting sleeve is movably socketed with the rotating shaft, the stator assembly is mounted on outside of the mounting sleeve inside the shell, there is a gap between the stator assembly and the magnetic pole, the stator assembly is used to generate a rotating magnetic field for driving the magnetic pole to rotate, the base is mounted on the mounting sleeve outside the shell, and there is a gap between the base and the second end of the shell; and an angular position sensor, wherein the angular position sensor is used to detect an angular position of the rotor assembly, and the angular position sensor comprises a trigger and a sensing element, the trigger is mounted on the second end of the shell, and the sensing element is mounted on a side surface of the base close to the shell.

2. The galvanometer motor according to claim 1, wherein an inner side wall of the second end of the shell is provided with a first step, one end of the trigger is mounted on the first step, and the other end of the trigger extends towards the base and to the outside of the shell.

3. The galvanometer motor according to claim 2, wherein a part of the trigger abutting the first step extends towards the rotating shaft to form a first supporting plane, an inner side wall of the first end of the shell is provided with a second step, one end of the magnetic pole abuts the second step, and the other end of the magnetic pole abuts the first supporting plane.

4. The galvanometer motor according to claim 1, wherein a maximum distance between the sensing element and an axis of the rotating shaft is 90% to 110% of an outer diameter of the shell, and/or the base and the shell are coaxially arranged, and an outer diameter of the base is 90% to 110% of an outer diameter of the shell.

5. The galvanometer motor according to claim 1, wherein an outer end surface of the first end of the shell is provided with a positioning block, the positioning block is used for cooperating with positioning of the galvanometer of a LiDAR, and there is a gap between the positioning block and the rotating shaft, and the positioning block has a positioning arc surface extending along an axis of the rotating shaft.

6. The galvanometer motor according to claim 5, wherein there are three positioning blocks, and positioning arc surfaces of the three positioning blocks are located on the same cylindrical surface.

7. The galvanometer motor according to claim 1, wherein a quantity of the magnetic poles is 20, and a quantity of slots of the stator assembly is 15, or a quantity of the magnetic poles is 10, and a quantity of slots of the stator assembly is 15.

8. The galvanometer motor according to claim 7, wherein the stator assembly comprises a stator lamination and a stator winding, the stator lamination comprises a stator yoke and a plurality of stator teeth, the stator yoke is in an annular structure, the stator yoke and the rotating shaft are coaxially arranged, the plurality of stator teeth are connected to an outer side of the stator yoke, the plurality of stator teeth are uniformly and at equal intervals distributed along a circumferential direction of the stator yoke, and the stator winding is wound on the plurality of stator teeth, the stator teeth comprise a tooth root and a tooth top sequentially connected along a radial direction of the stator yoke, the tooth root is connected to an end of the stator yoke, a size of the tooth root along the circumferential direction of the stator yoke is 1.0 mm to 1.2 mm, a size of an interval between the adjacent two tooth tops along the circumferential direction of the stator yoke is 1.3 mm to 1.5 mm, an inner diameter of the stator yoke is 8 mm to 11 mm, an outer diameter of the stator yoke is 11.5 mm to 12.5 mm, an outer diameter of the tooth top is 20 mm to 20.5 mm, an inner diameter of the magnetic pole is 20.7 mm to 21 mm, and an outer diameter of the magnetic pole is 23 mm to 24 mm.

9. A LIDAR, wherein the LiDAR comprises a galvanometer and a galvanometer motor, the galvanometer motor comprising:

a rotor assembly, wherein the rotor assembly comprises a shell, a rotating shaft, and a magnetic pole, the shell has a first end and a second end that are arranged opposite to each other, the second end of the shell has an opening, one end of the rotating shaft is connected to the first end of the shell, the other end of the rotating shaft extends towards the opening, the magnetic pole is mounted on an inner side wall of the shell, and there is a gap between the magnetic pole and the rotating shaft;

a fixing structure, wherein the fixing structure comprises a stator assembly, a mounting sleeve, and a base, the mounting sleeve is partially located inside the shell and partially extends to outside of the shell through the opening, the mounting sleeve is movably socketed with the rotating shaft, the stator assembly is mounted on outside of the mounting sleeve inside the shell, there is a gap between the stator assembly and the magnetic pole, the stator assembly is used to generate a rotating magnetic field for driving the magnetic pole to rotate, the base is mounted on the mounting sleeve outside the shell, and there is a gap between the base and the second end of the shell; and an angular position sensor, wherein the angular position sensor is used to detect an angular position of the rotor assembly, and the angular position sensor comprises a trigger and a sensing element, the trigger is mounted on the second end of the shell, and the sensing element is mounted on a side surface of the base close to the shell, wherein the galvanometer is mounted on the shell.

10. The LiDAR according to claim 9, wherein the LiDAR further comprises a dynamic balancing element, a first end cover, and a second end cover, the galvanometer is socketed with the shell and the base, the first end cover is mounted on one end of the galvanometer, and the second end cover is mounted on the other end of the galvanometer, and the dynamic balancing element is fixedly bonded to the first end cover or the second end cover by using adhesive with preset mass, or the dynamic balancing element is welded to the first end cover and/or the second end cover by using solder with preset mass.

* * * * *